United States Patent
Wang et al.

(10) Patent No.: US 10,202,475 B2
(45) Date of Patent: Feb. 12, 2019

(54) PROPYLENE COPOLYMER FOR EXTRUSION BLOW MOLDED BOTTLES

(71) Applicant: Borealis AG, Vienna (AT)

(72) Inventors: Jingbo Wang, Linz (AT); Johanna Lilja, Porvoo (FI); Markus Gahleitner, Neuhofen/Krems (AT); Juliane Braun, Linz (AT)

(73) Assignee: BOREALIS AG (AT)

( * ) Notice: Subject to any disclaimer, the term of this patent is extended or adjusted under 35 U.S.C. 154(b) by 0 days.

(21) Appl. No.: 14/897,888

(22) PCT Filed: Jun. 24, 2014

(86) PCT No.: PCT/EP2014/063201
§ 371 (c)(1),
(2) Date: Dec. 11, 2015

(87) PCT Pub. No.: WO2014/206950
PCT Pub. Date: Dec. 31, 2014

(65) Prior Publication Data
US 2016/0145366 A1    May 26, 2016

(30) Foreign Application Priority Data

Jun. 26, 2013 (EP) .................................... 13173857

(51) Int. Cl.
| | | |
|---|---|---|
| C08F 210/16 | (2006.01) | |
| C08L 23/14 | (2006.01) | |
| C08F 4/649 | (2006.01) | |
| C08F 210/06 | (2006.01) | |
| B29C 49/04 | (2006.01) | |
| B29K 23/00 | (2006.01) | |
| B29C 49/00 | (2006.01) | |

(52) U.S. Cl.
CPC .......... *C08F 210/06* (2013.01); *C08L 23/142* (2013.01); *B29C 49/0005* (2013.01); *B29C 49/04* (2013.01); *B29K 2023/14* (2013.01); *C08F 2800/10* (2013.01); *C08L 2203/10* (2013.01); *C08L 2205/025* (2013.01); *C08L 2308/00* (2013.01); *C08L 2314/02* (2013.01)

(58) Field of Classification Search
CPC ..... C08F 210/16; C08F 2500/12; B29C 49/04
USPC .................................................. 526/351, 65
See application file for complete search history.

(56) References Cited

U.S. PATENT DOCUMENTS

| | | | | |
|---|---|---|---|---|
| 5,436,213 A | * | 7/1995 | Iiskola ................... | C08F 10/00 502/103 |
| 6,545,099 B2 | * | 4/2003 | Shinozaki ............ | C08F 110/06 525/247 |
| 2006/0246308 A1 | * | 11/2006 | Kanai ................... | B32B 27/08 428/500 |
| 2009/0274921 A1 | * | 11/2009 | Ackermans ............ | B32B 27/32 428/516 |

FOREIGN PATENT DOCUMENTS

| | | | |
|---|---|---|---|
| CN | 102197083 A | 9/2011 | |
| CN | 102869719 A | 1/2013 | |
| EA | 019425 A | 7/2011 | |
| EP | 0887379 A1 | 12/1998 | |
| EP | 0887380 A1 | 2/2004 | |
| EP | 1580207 A1 * | 9/2005 | .............. C08F 10/00 |
| EP | 0887381 B1 | 11/2005 | |
| EP | 0991684 B1 | 1/2006 | |
| EP | 2380926 A1 * | 10/2011 | .............. C08J 3/226 |
| EP | 2386604 A1 * | 11/2011 | ........... B65D 1/0207 |
| RU | 2012148590 A | 5/2014 | |
| WO | 9212182 A1 | 7/1992 | |
| WO | 9924478 A1 | 5/1999 | |
| WO | 9924479 A1 | 5/1999 | |
| WO | 0068315 A1 | 11/2000 | |
| WO | 2004000899 A1 | 12/2003 | |
| WO | 2004111095 A1 | 12/2004 | |
| WO | 2010049371 A1 | 5/2010 | |
| WO | 2012007430 A1 | 1/2012 | |

OTHER PUBLICATIONS

Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28, 1128-1134.
Wang, Wen-Jun, et al., "Structural Analysis of Ethylene/Propylene Copolymers Synthesized Nith a Constrained Geometry Catalyst", Macromolecules 2000, 33, 1157-1162.
Kakugo, Masahiro, et al., "13C NMR Determination of Monomer Sequence Distribution in Ethylene-Propylene Copolymers Prepared with Sigma-TiCl3—Ai( C2H5)2 Cl" Macromolecules 1982, 15, 1150-1152.
Wagner, M.H., "Rheotens-Mastervurves and Drawability of Polymer Melts", Polymer Engineering and Science, Mid-Apr. 1996, vol. 36, No. 7.
Singh, Gurmeet, et al., "Triad Sequence Determination of Ethylene-Propylene Copolymers-Application of Quantitative 13C NMR", Polymer Testing 28 (2009) 475-479.
Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.
Cheng, H.N., "13C NMR Analysis of Ethylene-Propylene Rubbers", Macromolecules 1984, 17, 1950-1955.
Resconi, Luigi, et al., "Selectivity in Propene Polymerization With Metallocene Catalysts", Chem. Rev. 2000, 100, 1253-1345.
Department of Health and Human Services, Food and Drugs, Title 21, vol. 3, Apr. 1, 2014.
Pasquini, Neil, Polypropylene Handbook, 2nd Edition, 2005, p. 445.
Eifel, Dr. Hans, Plastic Additive Handbook, 5th Edition, 2001, pp. 956-965.
Search Report for Application No. PCT/EP2014/063201, dated May 26, 2017.
Office Action for Application No. PCT/EP2014/063201, dated May 29, 2017.
Chinese Office Action for Application No. 201480033451.3, dated Mar. 10, 2017.

* cited by examiner

*Primary Examiner* — Fred M Teskin
(74) *Attorney, Agent, or Firm* — Tarolli, Sundheim, Covell & Tummino LLP

(57) ABSTRACT

Extrusion blow molded article comprising a propylene copolymer having a high bottle appearance factor and good impact properties.

10 Claims, No Drawings

PROPYLENE COPOLYMER FOR EXTRUSION BLOW MOLDED BOTTLES

The present invention is directed to a new extrusion blow molded article as well as to the use of a new propylene copolymer to improve the optical properties of an extrusion blow molded article comprising said new propylene copolymer by keeping the stiffness on a high level.

It is well known in the polymer field that different applications require specifically tailored polymers to achieve the individual demanding properties. For instance a polymer used for injection molding must necessarily have other properties as a polymer used for blow molding.

The extrusion blow molding process for instance is a very special process that allows in a flexible and cheap way the preparation of different kind of bottles with respect to size and shape. Main drawback in this process is that the solidification step is very special compared to normal injection molding.

In the extrusion blow molding (EBM) process a polymer melt is first extruded through a tubular die into air forming a polymer tube, subsequently blowing up said polymer tube (typically called "parison" in this technical field) until the outside of the tube reaches the boundaries of the mold. To cover the wall of the mold fully with the blown up polymer tube is rather difficult compared to injection molding because the air between polymer tube and mold has to be removed totally which is a demanding process step. Further the inside of the polymer tube is not in contact with the mold and therefore there is only little possibility to influence the inner surface structure of the tube. As a consequence thereof extrusion blown molded articles, like bottles, normally show inferior optical properties compared to any injection molded articles. For instance, the surface property inside and/or outside of extrusion blown bottles is typically non-uniform (flow lines, melt fracture) leading to lower overall gloss and transparency compared to injection molded bottles or injection stretched blown molded articles (ISBM).

Further, it has become clear in the meantime that gloss or transparency should not be the only values to be used for judging the quality of the optical properties of extrusion blow molded articles. For instance it has been recognized that the visual appearance of extrusion blow molded articles is inacceptable even though the gloss values have been rather high. Thus it became clear that the gloss values alone were not enough to judge the optical appearance of the bottles and hence a new parameter, the so-called bottle appearance factor (BAF), was defined as BAF= (clarity*gloss)/haze.

Further the extrusion blow molded (EBM) products shall have rather high impact to prevent damages caused by fallings from rather high altitudes and shall have a rather high melting point which further extends the area of application.

Unfortunately polymers in this technical area quite often have rather high hexane soluble content. However, high amount of hexane extractables are not accepted in the food and health sector. Thus, beside the optical and mechanical properties the hexane soluble content of polymers is a critical issue.

Thus, there is still the demand to produce extrusion blow molded (EBM) products with improved optical properties and high impact. Preferably the extrusion molded article is featured by rather low amount of hexane extractables.

Thus the object of the present invention is to provide an extrusion blow molded article comprising propylene copolymer with improved optical properties and high impact. Further said extrusion blow molded article should have a rather low hexane content.

The finding of the present invention is to produce extrusion blow molded articles comprising a propylene copolymer with rather low melt flow rate and being monophasic, while having a moderate to low randomness.

Accordingly the present invention is directed to an extrusion blow molded article comprising a propylene copolymer (R-PP), wherein the extrusion blow molded article and/or the propylene copolymer (R-PP) has/have
(a) a comonomer content in the range of 3.0 to 10.0 mol.-%;
(b) a melt flow rate $MFR_2$ (230° C.) measured according to ISO 1133 in the range of 0.5 to 4.0 g/10 min; and
(c) a relative content of isolated to block ethylene sequences (I(E)) in the range of 45.0 to 69.0%, wherein the I(E) content is defined by equation (I)

$$I(E) = \frac{fPEP}{(fEEE + fPEE + fPEP)} \times 100 \qquad (I)$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample
wherein all sequence concentrations are based on a statistical triad analysis of $^{13}$C-NMR data.

Preferably, the extrusion blow molded article and/or the propylene copolymer (R-PP) is/are α-nucleated, i.e. comprise(s) an α-nucleating agent.

It has surprisingly been found that such an extrusion blow molded article has very high BAF values and high impact.

In the following the propylene copolymer (R-PP) being part of the extrusion blow molding article is defined. Subsequently the extrusion molded article is specified as well as the use of the propylene copolymer (R-PP) to improve the optical properties of the extrusion molded article comprising the propylene copolymer (R-PP).

Propylene Copolymer (R-PP)

The propylene copolymer (R-PP) according to this invention is preferably monophasic. Accordingly it is preferred that the propylene copolymer (R-PP) does not contain elastomeric (co)polymers forming inclusions as a second phase for improving mechanical properties. A polymer containing elastomeric (co)polymers as insertions of a second phase would by contrast be called heterophasic and is preferably not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the propylene copolymer (R-PP) according to this invention has no glass transition temperature below −30, preferably below −25° C., more preferably below −20° C.

On the other hand, in one preferred embodiment the propylene copolymer (R-PP) according to this invention has a glass transition temperature in the range of −12 to +2° C., more preferably in the range of −10 to +2° C.

The propylene copolymer (R-PP) according to this invention has a melt flow rate $MFR_2$ (230° C.) measured according to ISO 1133 in the range of 0.5 to 4.0 g/10 min, more preferably in the range of 0.8 to 3.5 g/10 min, still more preferably in the range of 1.0 to 3.0 g/10 min.

The propylene copolymer (R-PP) comprises apart from propylene also comonomers. Preferably the propylene copolymer (R-PP) comprises apart from propylene ethylene and/or $C_4$ to $C_{12}$ α-olefins. Accordingly the term "propylene copolymer" according to this invention is preferably understood as a polypropylene comprising, preferably consisting of, units derivable from (a) propylene
and
(b) ethylene and/or $C_4$ to $C_{12}$ α-olefins.

Thus the propylene copolymer (R-PP) according to this invention preferably comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymer (R-PP) according to this invention comprises, especially consists of, monomers copolymerizable with propylene from the group consisting of ethylene, 1-butene and 1-hexene. More specifically the propylene copolymer (R-PP) of this invention comprises—apart from propylene—units derivable from ethylene and/or 1-butene. In a preferred embodiment the propylene copolymer (R-PP) according to this invention comprises units derivable from ethylene and propylene only.

Additionally it is appreciated that the propylene copolymer (R-PP) preferably has a comonomer content in a very specific range which contributes to the impact strength and the good optical properties. Thus it is required that the comonomer content of the propylene copolymer (R-PP) is in the range of 3.0 to below 10.0 mol.-%, more preferably in the range of 3.2 to below 9.0 mol.-%, still more preferably in the range of 3.5 to 8.5 mol.-%, yet more preferably in the range of 4.0 to 8.0 mol.-%.

Further the propylene copolymer is featured by its relative content of isolated to block ethylene sequences (I(E)). The I(E) content [%] is defined by equation (I)

$$I(E) = \frac{fPEP}{(fEEE + fPEE + fPEP)} \times 100 \quad (I)$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample wherein all sequence concentrations are based on a statistical triad analysis of $^{13}$C-NMR data.

Accordingly it is preferred that the propylene copolymer (R-PP) has a I(E) content in the range 45.0 to 69.0%, more preferably in the range of 50.0 to 68.5%, still more preferably in the range of 52.0 to 68.0%.

Further the propylene copolymer (R-PP) has a melting temperature of at least 135° C., more preferably in the range of 135 to 155° C., still more preferably in the range of 138 to 150° C., like in the range of 140 to 149° C.

Further it is preferred that the propylene copolymer (R-PP) has a crystallization temperature of at least 99° C., more preferably in the range of 105 to 120° C., still more preferably in the range of 108 to 120° C., like in the range of 113 to 118° C. These values are especially applicable in case the propylene copolymer (R-PP) is nucleated, e.g. α-nucleated.

Preferably, the propylene copolymer (R-PP) has a xylene cold soluble fraction (XCS) in the range of 4.0 to 18.0 wt.-%, preferably in the range of 5.0 to 15.0 wt.-%, more preferably in the range of 6.0 to 12.0 wt-%.

Further it is preferred that the propylene copolymer (R-PP) has an hexane soluble content of below 10.0 wt.-%, more preferably in the range of above 0.5 to below 8.0 wt.-%, still more preferably in the range of 1.0 to 6.0 wt.-%, yet more preferably in the range of 1.8 to 5.0 wt.-%, still yet more preferably in the range of 2.0 to 4.0 wt.-%, like in the range of 2.0 to 3.5 wt.-%.

Preferably the propylene copolymer (R-PP) has a molecular weight distribution (Mw/Mn) of at least 2.0, more preferably in the range of 2.5 to 6.5, still more preferably in the range of 2.8 to 5.5.

Additionally or alternatively to the molecular weight distribution (Mw/Mn) as defined in the previous paragraph the propylene copolymer (R-PP) has preferably weight average molecular weight Mw in the range of 450 to 900 kg/mol, more preferably in the range of 500 to 800 kg/mol, like in the range of 550 to 740 kg/mol.

Preferably the propylene copolymer according to this invention has been produced in the presence of a Ziegler-Natta catalyst. The catalyst influences in particular the microstructure of the polymer. In particular, polypropylenes prepared by using a metallocene catalyst provide a different microstructure compared to polypropylenes prepared by using Ziegler-Natta (ZN) catalysts. The most significant difference is the presence of regio-defects in metallocene-made polypropylenes which is not the case for polypropylenes made by Ziegler-Natta (ZN). The regio-defects can be of three different types, namely 2,1-erythro (2,1e), 2,1-threo (2,1t) and 3,1 defects. A detailed description of the structure and mechanism of formation of regio-defects in polypropylene can be found in Chemical Reviews 2000,100(4), pages 1316-1327.

The term "2,1 regio defects" as used in the present invention defines the sum of 2,1 erythro regio-defects and 2,1 threo regio-defects.

Accordingly it is preferred that the propylene copolymer (R-PP) according to this invention has 2,1 regio-defects, like 2,1 erythro regio-defects, of at most 0.4%, more preferably of at most 0.3%, still more preferably of at most 0.2%, determined by $^{13}$C-NMR spectroscopy. In one specific embodiment no 2,1 regio-defects, like 2,1 erythro regio-defects, are detectable for the propylene copolymer (R-PP).

The propylene copolymer (R-PP) preferably comprises at least two polymer fractions, like two or three polymer fraction, all of them being propylene copolymers. Preferably the propylene copolymer (R-PP) comprises at least two different propylene copolymer fractions, like two different propylene copolymer fractions, wherein further the two propylene copolymer fractions preferably differ in the comonomer content and/or in the melt flow rate.

Preferably one fraction of the two polymer copolymer fractions of the propylene copolymer (R-PP) is the comonomer lean fraction and the other fraction is the comonomer rich fraction, wherein more preferably the lean fraction and the rich fraction fulfill together in-equation (II), more preferably in-equation (IIa), even more preferably in-equation (IIb), still more preferably in-equation (IIIc), $$\frac{Co(\text{rich})}{Co(\text{lean})} > 1.0, \quad (II)$$

$$1.0 < \frac{Co(\text{rich})}{Co(\text{lean})} \leq 4.0, \quad (IIa)$$

$$1.0 < \frac{Co(\text{rich})}{Co(\text{lean})} \leq 3.0 \quad (IIb)$$

wherein

Co (lean) is the comonomer content [mol.-%] of the propylene copolymer fraction with the lower comonomer content, Co (rich) is the comonomer content [mol.-%] of the propylene copolymer fraction with the higher comonomer content.

In addition or alternatively to inequation (III) one fraction of the two polymer copolymer fractions of the propylene copolymer (R-PP) is the low melt flow rate $MFR_2$ (230° C.) fraction and the other fraction is the high melt flow rate $MFR_2$ (230° C.) fraction, wherein more preferably the low flow fraction and the high flow fraction fulfill together inequation (III), more preferably inequation (Ma), still more preferably inequation (Mb), $$\frac{MFR(\text{high})}{MFR(\text{low})} > 1.0, \quad (III)$$

$$1.0 < \frac{MFR(\text{high})}{MFR(\text{low})} \leq 5.5, \quad (IIIa)$$

$$1.2 < \frac{MFR(\text{high})}{MFR(\text{low})} \leq 5.0, \quad (IIIb)$$

wherein

MFR (high) is the melt flow rate $MFR_2$ (230° C.) [g/10 min] of the propylene copolymer fraction with the higher melt flow rate $MFR_2$ (230° C.), MFR (low) is the melt flow rate $MFR_2$ (230° C.) [g/10 min] of the propylene copolymer fraction with the lower melt flow rate $MFR_2$ (230° C.).

Even more preferred the propylene copolymer (R-PP) comprises, preferably consists of, a first propylene copolymer fraction (R-PP1) and a second propylene copolymer fraction (R-PP2), wherein further the first propylene copolymer fraction (R-PP1) and the second propylene copolymer fraction (R-PP2) differ in the comonomer content and/or in the melt flow rate $MFR_2$ (230° C.). In one embodiment they differ in the comonomer content and in the melt flow rate $MFR_2$ (230° C.).

Thus in one embodiment the first propylene copolymer fraction (R-PP1) has a higher comonomer content and melt flow rate $MFR_2$ (230° C.) than the propylene copolymer fraction (R-PP2). [1$^{st}$ option]

In another embodiment the first propylene copolymer fraction (R-PP1) has a higher comonomer content but a lower melt flow rate $MFR_2$ (230° C.) than the second propylene copolymer fraction (R-PP2). [2$^{nd}$ option]

In still another embodiment the second propylene copolymer fraction (R-PP2) has a higher comonomer content but a lower melt flow rate $MFR_2$ (230° C.) than the first propylene copolymer fraction (R-PP1). [3$^{rd}$ option]

In further embodiment the second propylene copolymer fraction (R-PP2) has a higher comonomer content and melt flow rate $MFR_2$ (230° C.) than the first propylene copolymer fraction (R-PP1). This embodiment is especially preferred. [4$^{th}$ option]

The 3$^{rd}$ option is especially preferred.

Accordingly it is preferred that the first propylene copolymer fraction (R-PP1) and the second propylene copolymer fraction (R-PP2) fulfill together the in-equation (IV), more preferably in-equation (IVa), even more preferably in-equation (IVb), still more preferably in-equation (IVc), $$\frac{Co(R-PP2)}{Co(R-PP1)} > 1.0, \quad (IV)$$

$$1.0 < \frac{Co(R-PP2)}{Co(R-PP1)} \leq 4.0, \quad (IVa)$$

$$1.0 < \frac{Co(R-PP2)}{Co(R-PP1)} \leq 3.0 \quad (IVb)$$

$$1.0 < \frac{Co(R-PP2)}{Co(R-PP1)} \leq 4.0, \quad (IVa)$$

$$1.0 < \frac{Co(R-PP2)}{Co(R-PP1)} \leq 3.0 \quad (IVb)$$

wherein

Co (R-PP1) is the comonomer content [mol.-%] of the first propylene copolymer fraction (R-PP1), Co (R-PP2) is the comonomer content [mol.-%] of the second propylene copolymer fraction (R-PP2).

It is especially preferred that the propylene copolymer (R-PP) has higher comonomer content than the first propylene copolymer fraction (R-PP1). Accordingly the propylene copolymer (R-PP) comprises, preferably consists of, the first propylene copolymer fraction (R-PP1) and the second propylene copolymer fraction (R-PP2), wherein further the propylene copolymer (R-PP) fulfills the in-equation (V), more preferably in-equation (Va), even more preferably in-equation (Vb), still more preferably in-equation (Vc), $$\frac{Co(R-PP)}{Co(R-PP1)} > 1.0, \quad (V)$$

$$1.0 < \frac{Co(R-PP)}{Co(R-PP1)} \leq 2.5, \quad (Va)$$

$$1.0 < \frac{Co(R-PP)}{Co(R-PP1)} \leq 2.0, \quad (Vb)$$

$$1.0 < \frac{Co(R-PP)}{Co(R-PP1)} \leq 1.8 \quad (Vc)$$

wherein

Co (R-PP1) is the comonomer content [mol.-%] of the first propylene copolymer fraction (R-PP1), Co (R-PP) is the comonomer content [mol.-%] of the propylene copolymer (R-PP).

It is further preferred that the melt flow rate MFR$_2$ (230° C.) of the first propylene copolymer fraction (R-PP1) to the melt flow rate MFR$_2$ (230° C.) of the propylene copolymer (R-PP) differ by no more than 6.0 g/10 min, more preferably by no more than 4.0 g/10 min, still more preferably by no more than 2.0 g/10 min.

Accordingly it is especially preferred that the first propylene copolymer fraction (R-PP1) and the second propylene copolymer fraction (R-PP2) fulfill together the in-equation (VI), more preferably in-equation (VIa), even more preferably in-equation (VIb), $$\frac{MFR(R-PP1)}{MFR(R-PP2)} > 1.0, \tag{VI}$$

$$1.0 < \frac{MFR(R-PP1)}{MFR(R-PP2)} \leq 5.5, \tag{VIa}$$

$$1.2 \leq \frac{MFR(R-PP1)}{MFR(R-PP2)} \leq 5.0, \tag{VIb}$$

wherein
MFR (R-PP1) is the melt flow rate MFR$_2$ (230° C.) [g/10 min] of the first propylene copolymer fraction (R-PP1),
MFR (R-PP2) is the melt flow rate MFR$_2$ (230° C.) [g/10 min] of the second propylene copolymer fraction (R-PP2).

It is further preferred that the propylene copolymer (R-PP) has lower melt flow rate than the first propylene copolymer fraction (R-PP1). Accordingly the propylene copolymer (R-PP) comprises, preferably consists of, the first propylene copolymer fraction (R-PP1) and the second propylene copolymer fraction (R-PP2), wherein further the propylene copolymer (R-PP) fulfills the in-equation (VII), more preferably in-equation (VIIa), even more preferably in equation (VIIb), $$\frac{MFR(R-PP1)}{MFR(R-PP)} > 1.0, \tag{VII}$$

$$1.1 \leq \frac{MFR(R-PP1)}{MFR(R-PP)} \leq 3.0, \tag{VIIa}$$

$$1.1 \leq \frac{MFR(R-PP1)}{MFR(R-PP)} \leq 2.0, \tag{VIIb}$$

wherein
MFR (PP1) is the melt flow rate MFR$_2$ (230° C.) [g/10 min] of the first propylene copolymer fraction (R-PP1),
MFR (PP) is the melt flow rate MFR$_2$ (230° C.) [g/10 min] of the propylene copolymer (R-PP).

Thus it is preferred that the first propylene copolymer fraction (R-PP1) has a comonomer content of equal or below 8.0 mol-%, more preferably of equal or below 7.5 mol-%, still more preferably of equal or below 7.0 mol-%, yet more preferably in the range 1.0 to 8.0 mol-%, still yet more preferably in the range 1.0 to 7.0 mol-%, like in the range 2.0 to 6.5 mol-%.

Preferably the first propylene copolymer fraction (R-PP1) preferably has a melt flow rate MFR$_2$ (230° C.) in the range of in the range of 0.5 to 10.0 g/10 min, more preferably in the range 1.0 to 9.0 g/10 min, still more preferably in the range of 1.5 to 6.0 g/10 min.

On the other hand the second propylene copolymer fraction (R-PP2) preferably has a comonomer content of at least 4.0 mol-%, more preferably of at least 4.5 wt.-%, still more preferably of more than 5.0 mol-%, yet more preferably in the range of 4.0 to 14.0 mol-%, still more preferably in the range of more than 4.5 to 13.0 mol-%, still yet more preferably in the range 5.0 to 12.0 mol-%.

Preferably the second propylene copolymer fraction (R-PP2) preferably has a melt flow rate MFR$_2$ (230° C.) in the range of 0.05 to 6.0 g/10 min, more preferably in the range of 0.1 to 5.0 g/10 min, still more preferably in the range of 0.2 to 3.0 g/10 min.

The comonomers of the first propylene copolymer fraction (R-PP1) and the second propylene copolymer fraction (R-PP2), respectively, copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the first propylene copolymer fraction (R-PP1) and second propylene copolymer fraction (R-PP2), respectively, comprise, especially consist of, monomers copolymerizable with propylene from the group consisting of ethylene, 1-butene and 1-hexene. More specifically the first propylene copolymer fraction (R-PP1) and second propylene copolymer fraction (R-PP2), respectively, comprise—apart from propylene—units derivable from ethylene and/or 1-butene. In a preferred embodiment the first propylene copolymer fraction (R-PP1) and the second propylene copolymer fraction (R-PP2) comprise the same comonomers, i.e. ethylene only.

Preferably the weight ratio between the first propylene copolymer fraction (R-PP1) and the second propylene copolymer fraction (R-PP2) is 20/80 to 80/20, more preferably 30/70 to 70/30, like 40/60 to 68/32.

The propylene copolymer (R-PP) as defined in the instant invention may contain up to 5.0 wt.-% additives, like α-nucleating agents and antioxidants, as well as slip agents and antiblocking agents. Preferably the additive content (without α-nucleating agents) is below 3.0 wt.-%, like below 1.0 wt.-%.

Preferably the propylene copolymer (R-PP) comprises an α-nucleating agent. Even more preferred the present invention is free of β-nucleating agents. The α-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4, 6,-di-tert-butylphenyl)phosphate or aluminium-hydroxy-bis[2,2'-methylene-bis(4,6-di-t-butylphenyl)phosphate], and (iv) vinylcycloalkane polymer and vinylalkane polymer, and (v) mixtures thereof.

Such additives are generally commercially available and are described, for example, in "Plastic Additives Handbook", 5th edition, 2001 of Hans Zweifel.

Preferably the propylene copolymer (R-PP) contains up to 2.0 wt.-% of the α-nucleating agent. In a preferred embodiment, the propylene copolymer (R-PP) contains not more than 3000 ppm, more preferably of 1 to 3000 ppm, more preferably of 5 to 2000 ppm of an α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6: 5,7-bis-O-[(4-propylphenyl)methylene]-nonitol, vinylcycloalkane polymer, vinylalkane polymer, and mixtures thereof.

The propylene copolymer (R-PP) is especially further featured by its specific optical properties. Accordingly the propylene copolymer (R-PP) has preferably a bottle appearance factor (BAF) before sterilization of in-equation (VIII), more preferably of in-equation (VIIIa), yet more preferably of in-equation (VIIIb),

BAF>65 (VIII),

65<BAF≤200 (VIIIa),

68<BAF≤160 (VIIIb)

wherein
BAF is defined as:

$$BAF = \frac{C \times G}{H}$$

wherein
H is the haze value
C is the clarity value,
G is the gloss value,
wherein further
the haze, the clarity and the gloss are determined according to ASTM D 1003-07 on a test specimen cut from a bottle having a wall thickness of 0.6 mm made from propylene copolymer (R-PP).

The propylene copolymer (R-PP) according to this invention is preferably produced in a sequential polymerization process in the presence of a Ziegler-Natta catalyst as defined below.

Accordingly it is preferred that the propylene copolymer (R-PP) is produced in the presence of
(a) a Ziegler-Natta catalyst (ZN-C) comprises a titanium compound (TC), a magnesium compound (MC) and an internal donor (ID), wherein said internal donor (ID) is a non-phtalic acid ester,
(b) optionally a co-catalyst (Co), and
(c) optionally an external donor (ED).

Preferably the propylene copolymer (R-PP) is produced in a sequential polymerization process comprising at least two reactors (R1) and (R2), in the first reactor (R1) the first propylene copolymer fraction (R-PP1) is produced and subsequently transferred into the second reactor (R2), in the second reactor (R2) the second propylene copolymer fraction (R-PP2) is produced in the presence of the first propylene copolymer fraction (R-PP1).

The term "sequential polymerization system" indicates that the propylene copolymer (R-PP) is produced in at least two reactors connected in series. Accordingly the present polymerization system comprises at least a first polymerization reactor (R1) and a second polymerization reactor (R2), and optionally a third polymerization reactor (R3). The term "polymerization reactor" shall indicate that the main polymerization takes place. Thus in case the process consists of two polymerization reactors, this definition does not exclude the option that the overall system comprises for instance a pre-polymerization step in a pre-polymerization reactor. The term "consist of" is only a closing formulation in view of the main polymerization reactors.

Preferably at least one of the two polymerization reactors (R1) and (R2) is a gas phase reactor (GPR). Still more preferably the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR). Accordingly the average concentration of propylene copolymer (R-PP), i.e. the first fraction ($1^{st}$ F) of the propylene copolymer (R-PP) (i.e. the first propylene copolymer fraction (R-PP1)), in the polymer slurry within the loop reactor (LR) is typically from 15 wt.-% to 55 wt.-%, based on the total weight of the polymer slurry within the loop reactor (LR). In one preferred embodiment of the present invention the average concentration of the first propylene copolymer fraction (R-PP1) in the polymer slurry within the loop reactor (LR) is from 20 wt.-% to 55 wt.-% and more preferably from 25 wt.-% to 52 wt.-%, based on the total weight of the polymer slurry within the loop reactor (LR).

Preferably the propylene copolymer of the first polymerization reactor (R1), i.e. the first propylene copolymer fraction (R-PP1), more preferably the polymer slurry of the loop reactor (LR) containing the first propylene copolymer fraction (R-PP1), is directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first propylene copolymer fraction (R-PP1), is led directly to the next stage gas phase reactor.

Alternatively, the propylene copolymer of the first polymerization reactor (R1), i.e. the first propylene copolymer fraction (R-PP1), more preferably polymer slurry of the loop reactor (LR) containing the first propylene copolymer fraction (R-PP1), may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2), and any subsequent reactor, for instance the third polymerization reactor (R3), are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first polymerization reactor (R1) is a slurry reactor (SR), like loop reactor (LR), whereas the second polymerization reactor (R2) and any optional subsequent reactor, like the third polymerization reactor (R3), are gas phase reactors (GPRs). Accordingly for the instant process at least two, preferably two polymerization reactors (R1) and (R2) or three polymerization reactors (R1), (R2) and (R3), namely a slurry reactor (SR), like loop reactor (LR) and a (first) gas phase reactor (GPR1) and optionally a second gas phase reactor (GPR2), connected in series are used. If needed prior to the slurry reactor (SR) a pre-polymerization reactor is placed.

It is especially preferred that in the first polymerization reactor (R1), e.g. in the slurry reactor (SR), like loop reactor (LR), the first propylene copolymer fraction (R-PP1) and in the second polymerization reactor (R2), e.g. in the first gas phase reactors (GPR1), the second propylene copolymer fraction (R-PP2) is produced.

The Ziegler-Natta catalyst (ZN-C) is fed into the first polymerization reactor (R1) and is transferred with the polymer (slurry) obtained in the first polymerization reactor (R1) into the subsequent reactors. If the process covers also a pre-polymerization step it is preferred that all of the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Especially good results are achieved in case the temperature in the reactors is carefully chosen.

Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and optional in the third reactor (R3) is in the range of 75 to 95° C., more preferably in the range of 78 to 92° C.

Preferably the operating temperature in the second polymerization reactor (R2) is equal or higher to the operating temperature in the first polymerization reactor (R1). Accordingly it is preferred that the operating temperature
(a) in the first polymerization reactor (R1) is in the range of 62 to 85° C., more preferably in the range of 65 to 82° C., still more preferably in the range of 67 to 80° C., and
(b) in the second polymerization reactor (R2) is in the range of 75 to 95° C., more preferably in the range of 78 to 92° C., still more preferably in the range of 78 to 88° C., with the proviso that the operating temperature in the in the second polymerization reactor (R2) is equal or higher to the operating temperature in the first polymerization reactor (R1).

Still more preferably the operating temperature of the third polymerization reactor (R3)—if present—is higher than the operating temperature in the first polymerization reactor (R1). In one specific embodiment the operating temperature of the third polymerization reactor (R3)—if present—is higher than the operating temperature in the first polymerization reactor (R1) and in the second polymerization reactor (R2). Accordingly it is preferred that the operating temperature
(a) in the first polymerization reactor (R1) is in the range of 62 to 85° C., more preferably in the range of 65 to 82° C., still more preferably in the range of 67 to 80° C.,
(b) in the second polymerization reactor (R2) is in the range of 75 to 95° C., more preferably in the range of 78 to 92° C., still more preferably in the range of 78 to 88° C., and
(c) in the third polymerization reactor (R3)—if present—is in the range of 75 to 95° C., more preferably in the range of 78 to 92° C., still more preferably in the range of 85 to 92° C., like in the range of 87 to 92° C.,
with the proviso that the operating temperature in the in the second polymerization reactor (R2) is equal or higher to the operating temperature in the first polymerization reactor (R1) and
with the proviso that the third polymerization reactor (R3) is higher than the operating temperature in the first polymerization reactor (R1), preferably is higher than the operating temperature in the first polymerization reactor (R1) and in the second polymerization reactor (R2).

Typically the pressure in the first polymerization reactor (R1), preferably in the loop reactor (LR), is in the range of from 20 to 80 bar, preferably 30 to 70 bar, like 35 to 65 bar, whereas the pressure in the second polymerization reactor (R2), i.e. in the (first) gas phase reactor (GPR1), and optionally in any subsequent reactor, like in the third polymerization reactor (R3), e.g. in the second gas phase reactor (GPR2), is in the range of from 5 to 50 bar, preferably 15 to 40 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time ($\tau$) is defined as the ratio of the reaction volume ($V_R$) to the volumetric outflow rate from the reactor ($Q_o$) (i.e. $V_R/Q_o$), i.e $\tau=V_R/Q_o$ [tau=$V_R/Q_o$]. In case of a loop reactor the reaction volume ($V_R$) equals to the reactor volume.

Accordingly the average residence time (I) in the first polymerization reactor (R1) is preferably at least 15 min, more preferably in the range of 16 to 90 min, still more preferably in the range of 20 to 60 min, like in the range of 22 to 40 min, and/or the average residence time (I) in the second polymerization reactor (R2) is preferably at least 90 min, more preferably in the range of 90 to 300 min, still more preferably in the range of 100 to 280 min, yet more preferably in the range of 110 to 260 min. Preferably the average residence time (I) in the third polymerization reactor (R3)—if present—is preferably at least 30 min, more preferably in the range of 30 to 120 min, still more preferably in the range of 40 to 100 min, like in the range of 50 to 90 min.

Further it is preferred that the average residence time (I) in the total sequential polymerization system, more preferably that the average residence time (I) in the first (R1) second polymerization reactors (R2) and optional third polymerization reactor (R3) together, is at least 120 min, more preferably at least 140 min, still more preferably in the range of 140 to 400 min, more preferably in the range of 145 to 260 min.

As mentioned above the instant process can comprises in addition to the (main) polymerization of the propylene copolymer (R-PP) in the at least two polymerization reactors (R1, R3 and optional R3) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED)

are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C), the co-catalyst (Co), and the external donor (ED) are only added in the pre-polymerization reactor (PR), if a pre-polymerization is applied.

The pre-polymerization reaction is typically conducted at a temperature of 0 to 60° C., preferably from 15 to 50° C., and more preferably from 18 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed can be employed during pre-polymerization.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

As mentioned above, if a pre-polymerization is used, subsequent to said pre-polymerization, the mixture (MI) of the Ziegler-Natta catalyst (ZN-C) and the polypropylene (Pre-PP) produced in the pre-polymerization reactor (PR) is transferred to the first reactor (R1) and thus is being part of the first propylene copolymer fraction (R-PP1). Accordingly the properties of the first propylene copolymer fraction (R-PP1) defined above are actually the result of the polymer produced in the first reactor (R1) and the polypropylene (Pre-PP). However as typically the total amount of the polypropylene (Pre-PP) in the final propylene copolymer (R-PP) is rather low and typically not more than 5.0 wt.-%, more preferably not more than 4.0 wt.-%, still more preferably in the range of 0.5 to 4.0 wt.-%, like in the range 1.0 of to 3.0 wt.-%, the properties of the first propylene copolymer fraction (R-PP1) are not essentially influenced by the presence of the polypropylene (Pre-PP).

In case that pre-polymerization is not used propylene and the other ingredients such as the Ziegler-Natta catalyst (ZN-C) are directly introduced into the first polymerization reactor (R1).

Accordingly the process according the instant invention comprises the following steps under the conditions set out above (a) in the first polymerization reactor (R1), i.e. in a loop reactor (LR), propylene and a comonomer being ethylene and/or a $C_4$ to $C_{12}$ α-olefin, preferably propylene and ethylene, are polymerized obtaining a first propylene copolymer fraction (R-PP1) of the propylene copolymer (R-PP),
(b) transferring said first propylene copolymer fraction (R-PP1) to a second polymerization reactor (R2),
(c) in the second polymerization reactor (R2) propylene and a comonomer being ethylene and/or a $C_4$ to $C_{12}$ α-olefin, preferably propylene and ethylene, are polymerized in the presence of the first propylene copolymer fraction (R-PP1) obtaining a second propylene copolymer fraction (R-PP2) of the propylene copolymer (R-PP), said first propylene copolymer fraction (R-PP1) and said second propylene copolymer fraction (R-PP2) form the propylene copolymer (R-PP).

A pre-polymerization as described above can be accomplished prior to step (a).

The Ziegler-Natta Catalyst (ZN-C), the External Donor (ED) and the Co-Catalyst (Co)

As pointed out above in the specific process for the preparation of the propylene copolymer (R-PP) as defined above a Ziegler-Natta catalyst (ZN-C) must be used. Accordingly the Ziegler-Natta catalyst (ZN-C) will be now described in more detail.

The catalyst used in the present invention is a solid Ziegler-Natta catalyst (ZN-C), which comprises a titanium compound (TC), a magnesium compound (MC) and an internal donor (ID), wherein said internal donor (ID) is a non-phthalic acid ester, most preferably diester of non-phthalic dicarboxylic acids as described in more detail below. Thus, the catalyst used in the present invention is fully free of undesired phthalic compounds.

The Ziegler-Natta catalyst (ZN-C) can be further defined by the way as obtained. Accordingly the Ziegler-Natta catalyst (ZN-C) is preferably obtained by a process comprising the steps of a) providing a solution of at least one complex (A) being a complex of a magnesium compound (MC) and an alcohol comprising in addition to the hydroxyl moiety at least one further oxygen bearing moiety (A1) being different to a hydroxyl group, and optionally at least one complex (B) being a complex of said magnesium compound (MC) and an alcohol not comprising any other oxygen bearing moiety (B1),
b) combining said solution with a titanium compound (TC) and producing an emulsion the dispersed phase of which contains more than 50 mol.-% of the magnesium;
c) agitating the emulsion in order to maintain the droplets of said dispersed phase preferably within an average size range of 5 to 200 μm;
d) solidifying said droplets of the dispersed phase;
e) recovering the solidified particles of the olefin polymerisation catalyst component, and wherein an internal donor (ID) is added at any step prior to step c) and said internal donor (ID) is non-phthalic acid ester, preferably said internal donor (ID) is a diester of non-phthalic dicarboxylic acids as described in more detail below.

Detailed description as to how such a Ziegler-Natta catalyst (ZN-C) can be obtained is disclosed in WO 2012/007430.

In a preferred embodiment in step a) the solution of complex of magnesium compound (MC) is a mixture of complexes of magnesium compound (MC) (complexes (A) and (B)).

The complexes of magnesium compound (MC) (complexes (A) and (B)) can be prepared in situ in the first step of the catalyst preparation process by reacting said magnesium compound (MC) with the alcohol(s) as described above and in more detail below, or said complexes can be separately prepared complexes, or they can be even commercially available as ready complexes and used as such in the catalyst preparation process of the invention. In case the mixture of complexes of magnesium compound (MC) (complexes (A) and (B)) are prepared in situ in the first step of the catalyst preparation process they are preferably prepared by reacting said magnesium compound (MC) with the mixture of alcohols (A1) and (B1).

Preferably, the alcohol (A1) comprising in addition to the hydroxyl moiety at least one further oxygen bearing group different to a hydroxyl group to be employed in accordance with the present invention is an alcohol bearing an ether group.

Illustrative examples of such preferred alcohols (A1) comprising in addition to the hydroxyl moiety at least one further oxygen bearing group to be employed in accordance with the present invention areglycol monoethers, in particular $C_2$ to $C_4$ glycol monoethers, such as ethylene or propylene glycol monoethers wherein the ether moieties comprise from 2 to 18 carbon atoms, preferably from 4 to 12 carbon atoms. Preferred monoethers are $C_2$ to $C_4$ glycol monoethers and derivatives thereof. Illustrative and preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

In case a mixture of complexes (A) and (B) (or alcohols (A1) and (B1) respectively) are used, the different complexes or alcohols are usually employed in a mole ratio of A:B, or A1:B1 from 1.0:10 to 1.0:0.5, preferably this mole ratio is from 1.0:8.0 to 1.0:1.0, more preferably 1.0:6.0 to 1.0:2.0, even more preferably 1.0:5.0 to 1.0:3.0. As indicated in the ratios above it is more preferred that the amount of alcohol A1, preferably alcohol with ether moiety, is higher that alcohol B1, i.e. alcohol without any other oxygen bearing moiety different to hydroxyl.

The internal donor (ID) used in the preparation of the Ziegler-Natta catalyst (ZN-C) is preferably selected from (di)esters of non-phthalic carboxylic (di)acids and derivatives and mixtures thereof. The ester moieties, i.e. the moieties derived from an alcohol (i.e. the alkoxy group of the ester), may be identical or different, preferably these ester moieties are identical. Typically the ester moieties are aliphatic or aromatic hydrocarbon groups. Preferred examples thereof are linear or branched aliphatic groups having from 1 to 20 carbon atoms, preferably 2 to 16 carbon atoms, more preferably from 2 to 12 carbon atoms, or aromatic groups having 6 to 12 carbon atoms, optionally containing heteroatoms of Groups 14 to 17 of the Periodic Table of IUPAC, especially N, O, S and/or P. The acid moiety of the di- or monoacid(di)ester, preferably of the diester of diacid, preferably comprises 1 to 30 carbon atoms, more preferably, 2 to 20 carbon atoms, still more preferably 2 to 16 carbon atoms, optionally being substituted by aromatic or saturated or non-saturated cyclic or aliphatic hydrocarbyls having 1 to 20 C, preferably 1 to 10 carbon atoms and optionally containing heteroatoms of Groups 14 to 17 of the Periodic Table of IUPAC, especially N, O, S and/or P. Especially preferred esters are diesters of monounsaturated dicarboxylic acids.

In particular preferred esters are esters belonging to a group comprising malonates, maleates, succinates, glutarates, cyclohexene-1,2-dicarboxylates and benzoates, optionally being substituted as defined below, and any derivatives and/or mixtures thereof. Preferred examples are e.g. substituted maleates and citraconates, most preferably citraconates.

The internal donor (ID) or precursor thereof as defined further below is added preferably in step a) to said solution.

Esters used as internal donors (ID) can be prepared as is well known in the art. As example dicarboxylic acid diesters can be formed by simply reacting of a carboxylic diacid anhydride with a $C_1$-$C_{20}$ alkanol and/or diol.

The titanium compound (TC) is preferably a titanium halide, like $TiCl_4$.

The complexes of magnesium compounds can be alkoxy magnesium complexes, preferably selected from the group consisting of magnesium dialkoxides, and complexes of a magnesium dihalide and a magnesium dialkoxide. It may be a reaction product of an alcohol and a magnesium compound selected from the group consisting of dialkyl magnesiums, alkyl magnesium alkoxides and alkyl magnesium halides, preferably dialkyl magnesium. It can further be selected from the group consisting of dialkyloxy magnesiums, diaryloxy magnesiums, alkyloxy magnesium halides, aryloxy magnesium halides, alkyl magnesium alkoxides, aryl magnesium alkoxides and alkyl magnesium aryloxides.

The magnesium dialkoxide may be the reaction product of a dialkyl magnesium of the formula $R_2Mg$, wherein each one of the two Rs is a similar or different $C_1$-$C_{20}$ alkyl, preferably a similar or different $C_2$-$C_{10}$ alkyl with alcohols as defined in the present application. Typical magnesium alkyls are ethylbutyl magnesium, dibutyl magnesium, dipropyl magnesium, propylbutyl magnesium, dipentyl magnesium, butylpentyl magnesium, butyloctyl magnesium and dioctyl magnesium. Most preferably, one R of the formula $R_2Mg$ is a butyl group and the other R is an octyl or ethyl group, i.e. the dialkyl magnesium compound is butyl octyl magnesium or butyl ethyl magnesium.

Typical alkyl-alkoxy magnesium compounds RMgOR, when used, are ethyl magnesium butoxide, butyl magnesium pentoxide, octyl magnesium butoxide and octyl magnesium octoxide.

Dialkyl magnesium or alkyl magnesium alkoxide can react, in addition to the alcohol containing in addition to the hydroxyl group at least one further oxygen bearing moiety being different to a hydroxyl moiety, which is defined above in this application, with a monohydric alcohol R'OH, or a mixture thereof with a polyhydric alcohol $R'(OH)_m$.

Preferred monohydric alcohols are alcohols of the formula $R^b(OH)$, wherein $R^b$ is a $C_1$-$C_{20}$, preferably a $C_4$-$C_{12}$, and most preferably a $C_6$-$C_{10}$, straight-chain or branched alkyl residue or a $C_6$-$C_{12}$ aryl residue. Preferred monohydric alcohols include methanol, ethanol, n-propanol, iso-propanol, n-butanol, iso-butanol, sec-butanol, tert-butanol, n-amyl alcohol, iso-amyl alcohol, sec-amyl alcohol, tert-amyl alcohol, diethyl carbinol, sec-isoamyl alcohol, tert-butyl carbinol, 1-hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol, 1-undecanol, 1-dodecanol, 1-tridecanol, 1-tetradecanol, 1-pentadecanol, 1-hexadecanol, 1-heptadecanol 1-octadecanol and phenol or benzyl alcohol. The aliphatic monohydric alcohols may optionally be unsaturated, as long as they do not act as catalyst poisons. The most preferred monohydric alcohol is 2-ethyl-1-hexanol.

Preferred polyhydric alcohols are alcohols of the formula $R^a(OH)_m$, wherein $R^a$ is a straight-chain, cyclic or branched $C_2$ to $C_6$ hydrocarbon residue, (OH) denotes hydroxyl moieties of the hydrocarbon residue and m is an integer of 2 to 6, preferably 3 to 5. Especially preferred polyhydric alcohols include ethylene glycol, propylene glycol, trimethylene glycol, 1,2-butylene glycol, 1,3-butylene glycol, 1,4-butylene glycol, 2,3-butylene glycol, 1,5pentanediol, 1,6-hexanediol, 1,8-octanediol, pinacol, diethylene glycol, triethylene glycol, 1,2-catechol, 1,3-catechol and 1,4-catechol, and triols such as glycerol and pentaerythritol.

The solvents to be employed for the preparation of the Ziegler-Natta catalyst (ZN-C) may be selected among aromatic and aliphatic solvents or mixtures thereof. Preferably the solvents are aromatic and/or aliphatic hydrocarbons with 5 to 20 carbon atoms, preferably 5 to 16, more preferably 5 to 12 carbon atoms, examples of which include benzene, toluene, cumene, xylol and the like, with toluene being preferred, as well as pentane, hexane, heptane, octane and nonane including straight chain, branched and cyclic compounds, and the like, with hexanes and heptanes being particular preferred.

Mg compound (MC) is typically provided as a 10 to 50 wt-% solution in a solvent as indicated above. Typical commercially available MC solutions are 20-40 wt-% solutions in toluene or heptanes.

The reaction for the preparation of the complex of magnesium compound (MC) may be carried out at a temperature of 40° to 70° C.

In step b) the solution of step a) is typically added to the titanium compound (TC), such as titanium tetrachloride. This addition preferably is carried out at a low temperature, such as from −10 to 40° C., preferably from −5 to 20° C., such as about −5° C. to 15° C.

The temperature for steps b) and c), is typically −10 to 50° C., preferably from −5 to 30° C., while solidification typically requires heating as described in detail further below.

The emulsion, i.e. the two phase liquid-liquid system may be formed in all embodiments of the present invention by simple stirring and optionally adding (further) solvent(s) and additives, such as the turbulence minimizing agent (TMA) and/or the emulsifying agents described further below.

Preparation of the Ziegler-Natta catalyst (ZN-C) used in the present invention is based on a liquid/liquid two-phase system where no separate external carrier materials such as silica or $MgCl_2$ are needed in order to get solid catalyst particles.

The present Ziegler-Natta catalyst (ZN-C) particles are spherical and they have preferably a mean particle size from 5 to 500 μm, such as from 5 to 300 μm and in embodiments from 5 to 200 μm, or even from 10 to 100 μm. These ranges also apply for the droplets of the dispersed phase of the emulsion as described herein, taking into consideration that the droplet size can change (decrease) during the solidification step.

The process of the preparation of the Ziegler-Natta catalyst (ZN-C) as intermediate stage, yields to an emulsion of a denser, titanium compound (TC)/toluene-insoluble, oil dispersed phase typically having a titanium compound (TC)/magnesium mol ratio of 0.1 to 10 and an oil disperse phase having a titanium compound (TC)/magnesium mol ratio of 10 to 100. The titanium compound (TC) is preferably $TiCl_4$. This emulsion is then typically agitated, optionally in the presence of an emulsion stabilizer and/or a turbulence minimizing agent, in order to maintain the droplets of said dispersed phase, typically within an average size range of 5 to 200 μm. The catalyst particles are obtained after solidifying said particles of the dispersed phase e.g. by heating.

In effect, therefore, virtually the entirety of the reaction product of the Mg complex with the titanium compound (TC)—which is the precursor of the ultimate catalyst component—becomes the dispersed phase, and proceeds through the further processing steps to the final particulate form. The disperse phase, still containing a useful quantity of titanium compound (TC), can be reprocessed for recovery of that metal.

Furthermore, emulsifying agents/emulsion stabilizers can be used additionally in a manner known in the art for facilitating the formation and/or stability of the emulsion. For the said purposes e.g. surfactants, e.g. a class based on acrylic or methacrylic polymers can be used. Preferably, said emulsion stabilizers are acrylic or methacrylic polymers, in particular those with medium sized ester side chains having more than 10, preferably more than 12 carbon atoms and preferably less than 30, and preferably 12 to 20 carbon atoms in the ester side chain. Particular preferred are unbranched $C_{12}$ to $C_{20}$ (meth)acrylates such as poly(hexadecyl)-methacrylate and poly(octadecyl)-methacrylate.

Furthermore, in some embodiments a turbulence minimizing agent (TMA) can be added to the reaction mixture in order to improve the emulsion formation and maintain the emulsion structure. Said TMA agent has to be inert and soluble in the reaction mixture under the reaction conditions, which means that polymers without polar groups are preferred, like polymers having linear or branched aliphatic carbon backbone chains. Said TMA is in particular preferably selected from α-olefin polymers of α-olefin monomers with 6 to 20 carbon atoms, like polyoctene, polynonene, polydecene, polyundecene or polydodecene or mixtures thereof. Most preferable it is polydecene.

TMA can be added to the emulsion in an amount of e.g. 1 to 1.000 ppm, preferably 5 to 100 ppm and more preferable 5 to 50 ppm, based on the total weight of the reaction mixture.

It has been found that the best results are obtained when the titanium compound (TC)/Mg mol ratio of the dispersed phase (denser oil) is 1 to 5, preferably 2 to 4, and that of the disperse phase oil is 55 to 65. Generally the ratio of the mol ratio titanium compound (TC)/Mg in the disperse phase oil to that in the denser oil is at least 10.

Solidification of the dispersed phase droplets by heating is suitably carried out at a temperature of 70 to 150° C., usually at 80 to 110° C., preferably at 90 to 110° C. The heating may be done faster or slower. As especial slow heating is understood here heating with a heating rate of about 5° C./min or less, and especial fast heating e.g. 10° C./min or more. Often slower heating rates are preferable for obtaining good morphology of the catalyst component.

The solidified particulate product may be washed at least once, preferably at least twice, most preferably at least three times with a hydrocarbon, which preferably is selected from aromatic and aliphatic hydrocarbons, preferably with toluene, heptane or pentane. Washings can be done with hot (e.g. 90° C.) or cold (room temperature) hydrocarbons or combinations thereof.

Finally, the washed Ziegler-Natta catalyst (ZN-C) is recovered. It can further be dried, as by evaporation or flushing with nitrogen, or it can be slurried to an oily liquid without any drying step.

The finally obtained Ziegler-Natta catalyst (ZN-C) is desirably in the form of particles having generally an average size range of 5 to 200 μm, preferably 10 to 100, even an average size range of 20 to 60 μm is possible.

The Ziegler-Natta catalyst (ZN-C) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

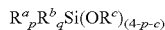

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Advantageously, the triethyl aluminium (TEAL) has a hydride content, expressed as AlH$_3$, of less than 1.0 wt % with respect to the triethyl aluminium (TEAL). More preferably, the hydride content is less than 0.5 wt %, and most preferably the hydride content is less than 0.1 wt %.

Preferably the ratio between the co-catalyst (Co) and the external donor (ED) [Co/ED] and/or the ratio between the co-catalyst (Co) and the transition metal (TM) [Co/TM] should be carefully chosen.

Accordingly
(a) the mol-ratio of co-catalyst (Co) to external donor (ED) [Co/ED] must be in the range of 3 to 45, preferably is in the range of 4 to 35, more preferably is in the range of 4.5 to 25; and optionally
(b) the mol-ratio of co-catalyst (Co) to titanium compound (TC) [Co/TC] must be in the range of above 50 to 500, preferably is in the range of 80 to 400, still more preferably is in the range of 100 to 350.

The additives as stated above are added to the propylene copolymer (R-PP) preferably by extruding. For mixing/extruding, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then further processed, e.g. by an extrusion blow molding process as described below.

Extrusion Blow Molded (EBM) Article

The present invention is especially directed to an extrusion blow molded article comprising the propylene copolymer (R-PP).

Extrusion blow molded articles differ essentially from injection blow molded articles and injection stretch blow molded articles. For instance extrusion blow molded article differ from injection blow molded articles and injection stretch blow molded articles in at least one of the properties selected from the group consisting of surface appearance, impact behavior, emissions, amount of volatiles and hexane extractables, to mention a few.

Accordingly the present invention is directed to an extrusion blow molded article comprising, preferably comprising at least 75 wt.-%, more preferably comprising at least 80 wt.-%, still more preferably comprising at least 90 wt.-%, yet more preferably comprising at least 95 wt.-%, still yet more preferably comprising at least 99 wt.-%, like consisting of, the propylene copolymer (R-PP) as defined above.

Accordingly as the propylene copolymer (R-PP) is the main component in the extrusion blow molded article, the extrusion blow molded article has preferably the same properties as the propylene copolymer (R-PP). Accordingly all properties mentioned for the propylene copolymer (R-PP) are equally applicable for the extrusion blow molded article. This applies in particular, but not only, for the melt flow rate MFR$_2$ (230° C.), the comonomer content, the I(E), the DSC properties, like melting temperature, and the xylene cold soluble (XCS) content.

Preferably the extrusion blow molded articles are bottles or containers, preferably bottles for household or industrial chemicals, for cosmetics, for pharmaceutical packaging or for food and drinks. Even more preferred the bottles have a dimensions of up to 10 l, preferably 100 ml to 5 l, like 200 ml to 2 l, and/or a wall thickness of 0.1 to 1.2 mm, like 0.2 to 0.8 mm.

The preparation of extrusion blow molded articles is well known in the art and for instance described in "Propylene handbook", Nello Pasquinin (Ed.), 2$^{nd}$ edition (2005), page 445, Hanser.

In extrusion blow molding (EBM), the polymer is melted and extruded into a hollow tube (a parison). This parison is then captured by closing it into a cooled forming mold. Compressed air is then blown into the parison, inflating it into the shape of the hollow bottle, container, or part. After the polymer has cooled sufficiently, the mold is opened and the part is ejected.

Use of the Propylene Copolymer (R-PP)

The present invention is also directed to the use of the propylene copolymer (R-PP) for the manufacture of an extrusion blow molded article. The present invention is in particular directed to the use of the propylene copolymer (R-PP) as defined above to improve the optical properties of an extrusion blow molded article, like an extrusion blow molded bottle, comprising, preferably comprising at least 75 wt.-%, more preferably comprising at least 80 wt.-%, still more preferably comprising at least 90 wt.-%, yet more preferably comprising at least 95 wt.-%, still yet more preferably comprising at least 99 wt.-%, like consisting of, said propylene copolymer (R-PP) by keeping the impact properties, especially expressed by the drop height, on a high level.

The improvement is especially accomplished when the extrusion blow molded article, like the extrusion blow molded bottle, comprising, preferably comprising at least 70 wt.-%, more preferably comprising at least 80 wt.-%, still more preferably comprising at least 90 wt.-%, yet more preferably comprising at least 95 wt.-%, still yet more preferably comprising at least 99 wt.-%, like consisting of, said propylene copolymer (R-PP) has
(a) a bottle appearance factor (BAF) before sterilization of in-equation (VIII), more preferably of in-equation (VIIIa), yet more preferably of in-equation (VIIIb),

BAF>65 (VIII),

65<BAF≤200 (VIIIa),

68<BAF≤160 (VIIIb)

wherein
BAF is defined as:

$$BAF = \frac{C \times G}{H}$$

wherein
H is the haze value
C is the clarity value,
G is the gloss value,
wherein further
the haze, the clarity and the gloss are determined according to ASTM D 1003-07 on a test specimen cut from a bottle having a wall thickness of 0.6 mm made from propylene copolymer (R-PP),
and
(b) a drop height at 23° C. of at least 1.0 m, more preferably of 1.0 to 6.0 m, still more preferably of 1.1 to 5.0 m, yet more preferably of 1.2 to 4.5 m.

In the following the present invention is further illustrated by means of examples.

EXAMPLES

1. Measuring Methods

The following definitions of terms and determination methods apply for the above general description of the invention as well as to the below examples unless otherwise defined. Calculation of comonomer content of the second propylene copolymer fraction (R-PP2):

$$\frac{C(PP) - w(PP1) \times C(PP1)}{w(PP2)} = C(PP2) \qquad (I)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
C(PP1) is the comonomer content [in mol-%] of the first propylene copolymer fraction (R-PP1),
C(PP) is the comonomer content [in mol-%] of the propylene copolymer (R-PP),
C(PP2) is the calculated comonomer content [in mol-%] of the second propylene copolymer fraction (R-PP2).

Calculation of melt flow rate $MFR_2$ (230° C.) of the second propylene copolymer fraction (R-PP2):

$$MFR(PP2) = 10^{\left[\frac{log(MFR(PP)) - w(PP1) \times log(MFR(PP1))}{w(PP2)}\right]} \qquad (III)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
MFR(PP1) is the melt flow rate $MFR_2$ (230° C.) [in g/10 min] of the first propylene copolymer fraction (R-PP1),
MFR(PP) is the melt flow rate $MFR_2$ (230° C.) [in g/10 min] of the propylene copolymer (R-PP),
MFR(PP2) is the calculated melt flow rate $MFR_2$ (230° C.) [in g/10 min] of the second propylene copolymer fraction (R-PP2).
$MFR_2$ (230° C.) is measured according to ISO 1133 (230° C., 2.16 kg load).

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C$ $\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C$ $\{^{1}H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol\ \%]=100*fE$$

The weight percent comonomer incorporation was calculated from the mole fraction:

$$E[wt\ \%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The relative content of isolated to block ethylene incorporation was calculated from the triad sequence distribution using the following relationship (equation (I)):

$$I(E) = \frac{fPEP}{(fEEE + fPEE + fPEP)} \times 100 \quad (I)$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample Bulk density, BD, is measured according ASTM D 1895
Particle Size Distribution, PSD
Coulter Counter LS 200 at room temperature with heptane as medium.

The xylene solubles (XCS, wt.-%): Content of xylene cold solubles (XCS) is determined at 25° C. according ISO 16152; first edition; 2005 Jul. 1

The hexane extractable fraction is determined according to FDA method (federal registration, title 21, Chapter 1, part 177, section 1520, s. Annex B) on cast films of 100 μm thickness produced on a monolayer cast film line with a melt temperature of 220° C. and a chill roll temperature of 20° C. The extraction was performed at a temperature of 50° C. and an extraction time of 30 min.

Number Average Molecular Weight ($M_n$), Weight Average Molecular Weight ($M_w$) and Polydispersity (Mw/Mn) are determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methylphenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

DSC Analysis, Melting Temperature ($T_m$) and Heat of Fusion ($H_f$), Crystallization Temperature ($T_c$) and Heat of Crystallization ($H_c$):

measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and heat of crystallization ($H_c$) are determined from the cooling step, while melting temperature and heat of fusion ($H_f$) are determined from the second heating step.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Description/Dimension and Production of the Bottles 11 bottles, having an outer diameter of 90 mm, a wall thickness of 0.6 mm, an overall-height of 204 mm and a height of the cylindrical mantle of 185 mm were produced by extrusion blow moulding on a B&W machine with a single screw extruder using a melt temperature of 210° C. and a mould temperature of 15° C.

Transparency, Clarity, and Haze Measurement on Bottles
Instrument:
Haze-gard plus from BYK-Gardner
Testing:
according to ASTM D1003 (as for injection molded plates)
Method:
The measurement is done on the outer wall of the bottles. The top and bottom of the bottles are cut off. The resulting round wall is then split in two, horizontally. Then from this wall six equal samples of app. 60×60 mm are cut from close to the middle. The specimens are placed into the instrument with their convex side facing the haze port. Then the transparency, haze and clarity are measured for each of the six samples and the haze value is reported as the average of these six parallels.

Gloss Measurement on Bottles

Instrument:

Screen TRI-MICROGLOSS 20-60-80 from BYK-Gardner 20

Testing:

ASTM D 2457 (as for injection molded plates)

The Bottles:

It is measured on the wall of the bottles. The top and bottom of the bottles is cut off. This round wall is then split in two, horizontally. Then this wall is cut into six equal 25 samples of app. 90×90 mm, just to fit into a special light trap made for testing on injection molded parts. Then the gloss at 20° is measured on these six samples, and the average value is reported as gloss at 20°.

Drop Test on Bottles (Progressive)

During the progressive drop test each bottle as defined above is dropped several times in a row from increasing heights. The test is stopped for each bottle when fracture occurs. The drop test is performed on the extrusion blow moulded 1l bottles as described before. The bottles are filled up to their shoulder with water.

For each test series at least 12 bottles are required. 4 bottles are dropped simultaneously from a starting height which is chosen according to the following table, where the expected fracture drop height has been determined in pretests or has been chosen from experience:

|  | Expected fracture drop height [m] | | |
|---|---|---|---|
|  | 0.3-1.0 | 1.0-2.5 | 2.5-5.0 |
| Starting drop height [m] | 0.2 | 0.5 | 2.0 |

Those bottles that show fracture are discarded and the test is continued with the remaining bottles at increasing heights. The size of the steps by which the height is increased depends on the starting height. Below a starting height of 0.5 m the step size is 0.1 m while equal to or above 0.5 m the step size is 0.25 m. The fracture drop height is noted for each bottle and from the single values the average fracture drop height is calculated according to the following formula:

$$h_p = \Sigma(h_i)/n_g$$

wherein $h_p$=average fracture drop height
$h_i$=individual fracture drop height
$n_g$=total number of dropped containers Top Load (Max Force)

Aim of this measurement is to determine the stiffness of the aforementioned 1l round bottles. Determined by this method is the deformation force at 1 mm, 2 mm and 3 mm deformation of the round bottle. Additionally the maximum force $F_{max}$ and the deformation in mm at $F_{max}$ are determined.

The bottles have a height of 204 mm (as defined above).

Before testing, the bottles are conditioned for 7 days at a temperature of 23° C. and at relative humidity of 50% (+/−5%). The burr of the bottle orifice is removed.

Top load is tested at universal testing machine of the class 1 according to DIN 51221. Bottles to be tested are put between two parallel buffed plates of hardened steel, one plate is fixed and the other plate is moving. Force is recorded and results are given as $F_{max}$ (N) and Deformation at Maximum Force (mm)

Eight bottles are tested with speed of 10 mm/min by using 2.5 kN load cell. The test results of the eight tested bottles give the average value.

Melt Strength and Max Velocity (Rheotens Test)

The test described herein follows ISO 16790:2005.

The strain hardening behaviour is determined by the method as described in the article "Rheotens-Mastercurves and Drawability of Polymer Melts", M. H. Wagner, Polymer Engineering and Science, Vol. 36, pages 925 to 935. The content of the document is included by reference. The strain hardening behaviour of polymers is analysed by Rheotens apparatus (product of Göttfert, Siemensstr.2, 74711 Buchen, Germany) in which a melt strand is elongated by drawing down with a defined acceleration. The haul-off force F in dependence of draw-down velocity v is recorded. The test procedure is performed in a standard climatized room with controlled room temperature of 23° C. and 30 bar. The Rheotens apparatus is combined with an extruder/melt pump for continuous feeding of the melt strand. The extrusion temperature is 200° C.; a capillary die with a diameter of 2 mm and a length of 6 mm is used. The strength length between the capillary die and the Rheotens wheels is 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand in drawn down is 120 mm/sect. The Rheotens was operated in combination with the PC program EXTENS. This is a real-time data-acquisition program, which displays and stores the measured data of tensile force and drawdown speed. After plotting the diagram of tensile force versus draw down speed, the maximum point before strand breakage is determined, where the force equals the melt strength value and the velocity the maximum velocity value.

2. Examples

The catalyst used in the polymerization process for the propylene copolymer of the inventive examples (IE1) (IE2) and (IE3) was produced as follows:

Used Chemicals:

20% solution in toluene of butyl ethyl magnesium (Mg(Bu)(Et), BEM), provided by Chemtura 2-ethylhexanol, provided by Amphochem 3-Butoxy-2-propanol—(DOWANOL™ PnB), provided by Dow bis(2-ethylhexyl)citraconate, provided by SynphaBase TiCl$_4$, provided by Millenium Chemicals Toluene, provided by Aspokem Viscoplex® 1-254, provided by Evonik Heptane, provided by Chevron Preparation of a Mg Complex First a magnesium alkoxide solution was prepared by adding, with stirring (70 rpm), into 11 kg of a 20 wt-% solution in toluene of butyl ethyl magnesium (Mg(Bu)(Et), BEM), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of $TiCl_4$ and 1.1 kg of toluene were added into a 20 l stainless steel reactor. Under 350 rpm mixing and keeping the temperature at 0° C., 14.5 kg of the Mg complex prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away.

Then the catalyst particles were washed with 45 kg of toluene at 90° C. for 20 minutes followed by two heptane washes (30 kg, 15 min) During the first heptane wash the temperature was decreased to 50° C. and during the second wash to room temperature. The solid catalyst component was used along with triethyl-aluminium (TEAL) as co-catalyst and dicyclo pentyl dimethoxy silane (D-donor) as donor.

The aluminium to donor ratio, the aluminium to titanium ratio and the polymerization conditions are indicated in table 1.

TABLE 1

Preparation of the examples

|  |  | IE1 | IE2 | IE3 | CE1 | CE2 |
|---|---|---|---|---|---|---|
| TEAL/Ti | [mol/mol] | 333 | 167 | 264 |  |  |
| TEAL/Donor | [mol/mol] | 5.6 | 4.8 | 5.2 |  |  |
| Loop (R-PP1) |  |  |  |  |  |  |
| Time | [min] | 28 | 24 | 35 |  |  |
| Temperature | [° C.] | 70 | 70 | 70 |  |  |
| $MFR_2$ | [g/10 min] | 2.6 | 3.0 | 3.1 | 1.5 | 2.8 |
| XCS | [wt.-%] | 7.8 | 7.9 | n.m. | n.m. | n.m. |
| C2 content | [mol-%] | 4.0 | 3.7 | 4.8 | 6.9 | 5.2 |
| $H_2$/C3 ratio | [mol/kmol] | 0.57 | 0.60 | 0.53 |  |  |
| C2/C3 ratio | [mol/kmol] | 6.9 | 8.0 | 7.6 |  |  |
| amount | [wt.-%] | 62 | 57 | 43 | 40 | 40 |
| 1 GPR (R-PP2) |  |  |  |  |  |  |
| Time | [min] | 230 | 127 | 165 |  |  |
| Temperature | [° C.] | 85 | 85 | 80 |  |  |
| $MFR_2$ | [g/10 min] | 0.55 | 1.2 | 2.4 | 1.5 | 1.5 |
| C2 content | [mol-%] | 11.6 | 9.0 | 5.2 | 6.9 | 5.2 |
| $H_2$/C3 ratio | [mol/kmol] | 2.0 | 2.0 | 3.2 |  |  |
| C2/C3 ratio | [mol/kmol] | 27.8 | 27.6 | 15.1 |  |  |
| amount | [wt.-%] | 38 | 43 | 57 | 60 | 60 |
| Final |  |  |  |  |  |  |
| $MFR_2$ | [g/10 min] | 1.4 | 2.0 | 2.7 | 1.5 | 2.0 |
| C2 content | [mol-%] | 6.9 | 6.0 | 5.0 | 6.9 | 5.2 |
| Mw | [kg/mol] | 672 | 605 | 588 | 615 | 650 |
| Mw/Mn | [—] | 5.2 | 5.1 | 5.3 | 5.0 | 4.9 |
| 2,1 | [%] | n.d. | n.d. | n.d. | n.d. | n.d. | n.d. not detectable
n.m. not measured

All polymer powders were compounded in a co-rotating twin-screw extruder Coperion ZSK 57 at 220° C. with 0.2 wt.-% of Irganox B225 (1:1-blend of Irganox 1010 (Pentaerythrityl-tetrakis(3-(3',5'-di-tert.butyl-4-hydroxytoluyl)-propionate and tris (2,4-di-t-butylphenyl)phosphate) phosphite) of BASF AG, Germany) and 0.1 wt.-% calcium stearate. The materials of IE1, IE2 and CE1, were nucleated with 1700 ppm Millad 3988 (1,3:2,4 di(methylbenzylidene)sorbitol). The materials of IE3 and CE2 were nucleated with 2000 ppm Adekastab NA-21 (aluminium-hydroxy-bis[2,2'-methylene-bis(4,6-di-t-butylphenyl)phosphate]).

CE1 is the commercial grade Borclear RB307MO available from Borealis Polyolefine GmbH, Austria, an α-nucleated propylene-ethylene random copolymer having a melting point of 144° C. and an $MFR_2$ (230° C.) of 1.5 g/10 min.

CE2 is the commercial grade RB206MO available from Borealis Polyolefine GmbH, Austria, an α-nucleated propylene-ethylene random copolymer having a melting point of 145° C. and an $MFR_2$ (230° C.) of 2.0 g/10 min.

TABLE 2

Properties of the Examples

| Example |  | IE1 | IE2 | IE3 | CE1 | CE2 |
|---|---|---|---|---|---|---|
| MFR | [g/10 min] | 1.4 | 2.0 | 2.7 | 1.5 | 2.0 |
| Tm | [° C.] | 144 | 146 |  | 144 | 145 |
| Tc | [° C.] | 113 | 113 | 117 | 108 | 112 |
| Tg | [° C.] | −4.8 | −4.1 | −3.3 | −5.0 | −3.5 |
| C2 | [mol-%] | 6.9 | 6.0 | 5.0 | 6.9 | 5.2 |
| XCS | [wt.-%] | 8.8 | 7.9 | 6.9 | 8.5 | 5.7 |
| Hexane solubles | [wt.-%] | 2.5 | 2.5 | 2.3 | 1.6 | 1.2 |
| Melt strength | [cN] | 14.6 | 11.2 | 10.8 | 14.4 | 9.6 |
| Max velocity | [mm/s] | 167 | 169 | 170 | 168 | 165 |
| Drop height at 23° C. | [m] | 4.0 | 2.0 | 1.2 | 2.9 | 1.1 |
| Max Force | [N] | 411 | 487 | 574 | 389 | 491 |
| Gloss | [%] | 19 | 21 | 22 | 19 | 20 |
| Haze | [%] | 20 | 19 | 21 | 23 | 26 |
| Clarity | [%] | 74 | 82 | 82 | 77 | 79 |
| BAF | [—] | 70 | 91 | 87 | 64 | 60 |

TABLE 3

Relative content of isolated to block ethylene sequences (I(E))

| Example |  |  |  |  |  |  |
|---|---|---|---|---|---|---|
|  |  | IE1 | 1E2 | 1E3 | CE1 | CE2 |
| n-PEP[1)] | [%] | 66 | 68 | 66 | 70 | 73 |
| EEE | [mol-%] | 0.97 | 0.68 | 0.73 | 0.43 | 0.32 |
| EEP | [mol-%] | 1.42 | 1.38 | 1.09 | 1.34 | 0.99 |
| PEP | [mol-%] | 4.60 | 4.34 | 3.48 | 4.11 | 3.52 |

1) $I(E) = \dfrac{fPEP}{(fEEE + fPEE + fPEP)} \times 100 \quad (I)$

The invention claimed is:

1. An extrusion blow molded article comprising at least 99 wt. % of a propylene copolymer (R-PP), based on the weight of the blow molded article, wherein the propylene copolymer (R-PP) has:

(a) a comonomer content in the range of 3.0 to 10.0 mol. %;

(b) a melt flow rate $MFR_2$ (230° C.) measured according to ISO 1133 in the range of 0.5 to 4.0 g/10 min;

(c) a relative content of isolated to block ethylene sequences (I(E)) in the range of 45.0 to 69.0%, wherein the I(E) content is defined by equation (I):

$$I(E) = \frac{fPEP}{(fEEE + fPEE + fPEP)} \times 100 \quad (I)$$

wherein:

I(E) is the relative content of isolated to block ethylene sequences [in %];

fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample;
and wherein:
all sequence concentrations are based on a statistical triad analysis of $^{13}$C-NMR data; and
(d) a hexane soluble content in the range of 1.8 to 5.0 wt. %, wherein the propylene copolymer (R-PP) has been produced in the presence of:
(i) a Ziegler-Natta catalyst (ZN-C) comprising a titanium compound (TC), a magnesium compound (MC) and an internal donor (ID), wherein said internal donor (ID) is a non-phthalic acid ester,
(ii) optionally a co-catalyst (Co), and
(iii) optionally an external donor (ED);
wherein said propylene copolymer (R-PP) comprises two fractions, a first propylene copolymer fraction (R-PP1) and a second propylene copolymer fraction (R-PP2), the comonomers of the first propylene copolymer fraction (R-PP1) and the second propylene copolymer fraction (R-PP2) are selected from ethylene, $C_4$ to $C_{12}$ α-olefin, and mixtures thereof, said first propylene copolymer fraction (R-PP1) differs from said second propylene copolymer fraction (R-PP2) in the comonomer content,
the weight ratio between the first propylene copolymer fraction (R-PP1) and the second propylene copolymer fraction (R-PP2) [(R-PP1):(R-PP2)] is 40:60 to 68:32, and
the first propylene copolymer fraction (R-PP1) has a comonomer content in the range of 1.0 to 7.0 mol % based on the first propylene copolymer fraction (R-PP1) and the second propylene copolymer fraction (R-PP2) has a comonomer content in the range of more than 4.5 to 13.0 mol % based on the second propylene copolymer fraction (R-PP2).

2. An extrusion blow molded article according to claim 1, wherein the propylene copolymer (R-PP) has a xylene cold soluble fraction (XCS) in the range of 4.0 to 18.0 wt. %.

3. An extrusion blow molded article according to claim 1, wherein the propylene copolymer (R-PP) has:
(a) a glass transition temperature in the range of −12 to +2° C.; and/or
(b) no glass transition temperature below −20° C.

4. An extrusion blow molded article according to claim 1, wherein the propylene copolymer (R-PP) has:
(a) a melting temperature in the range of 135 to 155° C.; and/or
(b) a crystallization temperature in the range of 105 to 120° C.

5. An extrusion blow molded article according to claim 1, wherein the propylene copolymer (R-PP):
(a) has 2,1 regio-defects of at most 0.4% determined by $^{13}$C-NMR spectroscopy; and/or
(b) is monophasic.

6. An extrusion blow molded article according to claim 1, wherein said first propylene copolymer fraction (R-PP1) differs from said second propylene copolymer fraction (R-PP2) in the melt flow rate.

7. An extrusion blow molded article according to claim 1, wherein:
(a) the internal donor (ID) is selected from optionally substituted malonates, maleates, succinates, glutarates, cyclohexene-1,2-dicarboxylates, benzoates and derivatives and/or mixtures thereof; and
(b) the molar-ratio of co-catalyst (Co) to external donor (ED) [Co/ED] is 3 to 45.

8. An extrusion blow molded article according to claim 1, wherein the propylene copolymer (R-PP) is produced in a sequential polymerization process comprising at least two reactors (R1) and (R2), in the first reactor (R1) the first propylene copolymer fraction (R-PP1) is produced and subsequently transferred into the second reactor (R2), in the second reactor (R2) the second propylene copolymer fraction (R-PP2) is produced in the presence of the first propylene copolymer fraction (R-PP1).

9. An extrusion blow molded article according to claim 1, wherein the extrusion blow molded article is a bottle.

10. An extrusion blow molded article according to claim 1, wherein the internal donor (ID) is a citraconate.

* * * * *